United States Patent Office 3,348,419
Patented Oct. 24, 1967

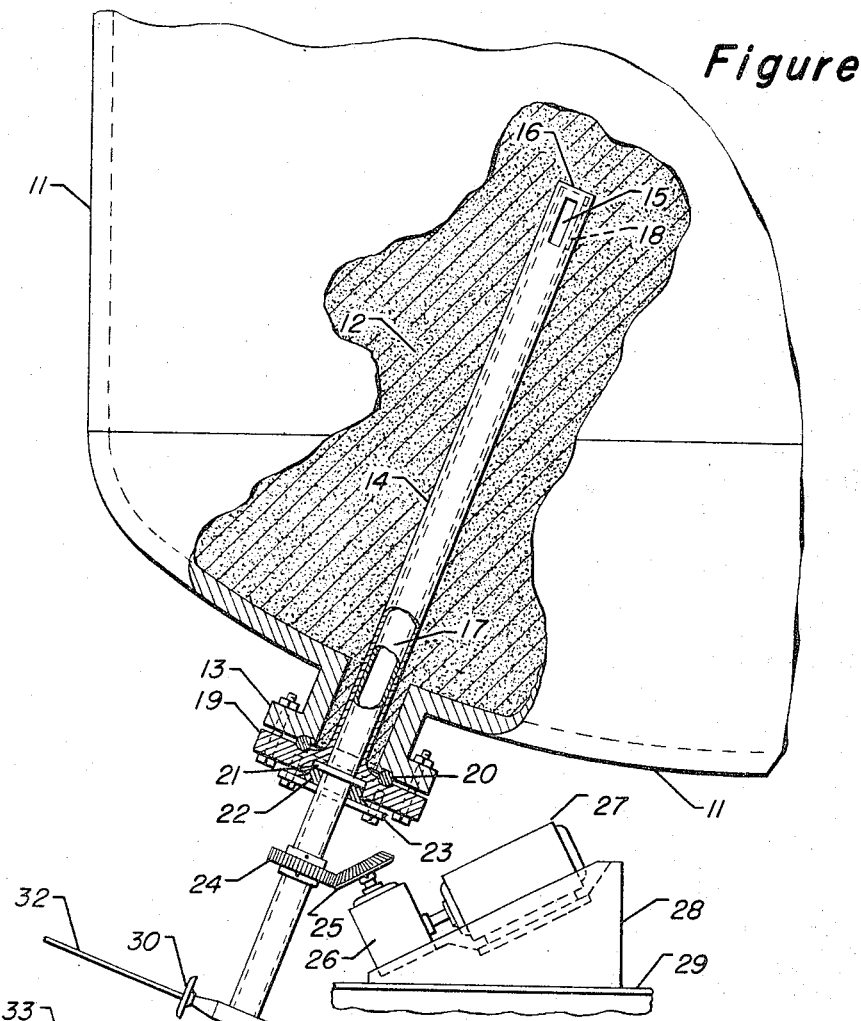
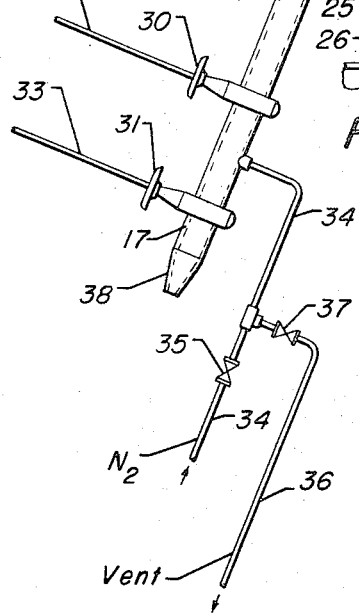
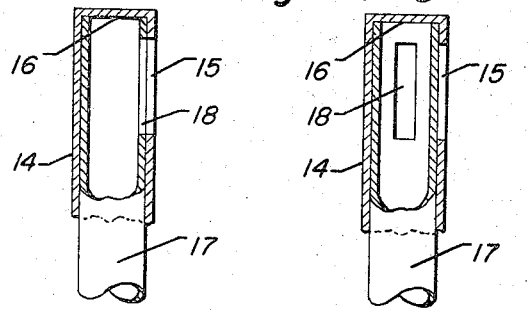

3,348,419
SOLIDS SAMPLING APPARATUS
George E. Addison, Des Plaines, Ill., assignor to Universal Oil Products Company, Des Plaines, Ill., a corporation of Delaware
Filed Dec. 28, 1964, Ser. No. 421,524
8 Claims. (Cl. 73—424)

ABSTRACT OF THE DISCLOSURE

Apparatus for withdrawing catalyst samples from a high pressure reactor using an outer tubular stator extending upwardly into the reactor and a reciprocable tubular rotor assembled within the stator and extending downwardly outside the reactor. The stator and rotor have slotted openings which, upon mutual registry, permit catalyst to enter and descend through the hollow rotor. A pair of longitudinally spaced apart block valves carried by the lower extension of the rotor together with a gas pressurizing and purging line connected into the rotor between the valves controls catalyst removal.

This invention relates to apparatus for withdrawing samples of a solid particle-form material from a closed vessel containing a fixed bed of such material. More particularly the invention is directed to a catalyst sampler for successively withdrawing batch samples of particulated or spherical catalyst from a high pressure catalytic reactor containing a fixed bed of catalyst while the reactor is onstream.

In commercial processes for the catalytic conversion of hydrocarbons which involve contacting a hydrocarbon feed stock under conversion conditions with a fixed catalyst bed, typified by naphtha reforming, hydrodesulfurization of naphthas or middle distillates, heavy oil hydrocracking and n-paraffin isomerization, it is frequently desirable to evaluate catalyst performance during an extended course of operation. Such evaluation relates to catalyst aging and regenerability and may include, for example, analyses for coke, heavy metals or other catalyst deactivator, determination of data pertaining to catalyst pore structure and surface characteristics, and measuring the loss of a volatile catalytic constituent. From the data obtained and with the view of maximizing the profitability of the process, a decision may be reached whether to regenerate or to replace the catalyst or merely to change operating parameters. Heretofore in the art the procurement of catalyst samples from a fixed bed reactor has had to await the shutdown of the process unit, as during a scheduled turnaround. In consequence there was a prolonged interval between successive catalyst analyses during which little or no direct information concerning the catalyst was available; any changes in catalyst properties had to be inferred secondarily from changes in yield structure, net gas make, recycle gas composition and the like. But from a practical standpoint, the raw data obtainable from a commercially scaled plant generally is inadequately detailed and too unreliable to permit a satisfactory appraisal of catalyst condition.

The present invention is concerned with a novel apparatus for obtaining samples of catalyst from a high pressure, high temperature catalytic reactor containing a fixed bed of particle-form catalyst without the necessity of shutting down or depressuring the reactor. In its simplest form the apparatus comprises a pair of concentric pipes including an outer stationary pipe and an inner pipe rotatably mounted within the former. The stator-rotor assembly is inserted through a suitable opening in the reactor wall into the catalyst bed and is preferably so oriented as to extend upwardly and at an angle inclined to the horizontal. The lower end of the stator is sealably fastened to the reactor by a flanged, threaded or welded connection. The rotor is made longer than the stator and extends downwardly therethrough to the exterior of the vessel. The annular space between the stator and the lower extension of the rotor is provided with a mechanical or other rotary seal to contain the high pressure fluid within the reactor. A pair of apertures formed in the upper tip portion of the stator wall and rotor wall, respectively, are adapted to register with each other only over a limited angular displacement of the rotor to define a fixed port connecting the interior of the rotor with the exterior of the stator. When the rotor aperture is moved into alignment with the stator aperture, the static head of catalyst surrounding the stator tip forces catalyst into the hollow rotor and it then descends by gravitation to the lower end of the rotor. The lower external extension of the rotor is provided with a pair of serially connected block valves to form a pressure lock particle transfer means whereby the sampled catalyst may be safely discharged into an open portable container. Coupled to the lower external extension of the rotor is a reversible rotary drive means, such as a double-acting hydraulic or pneumatic piston, reversible electric motor, or a manually operated lever, for reciprocably turning the rotor about its longitudinal axis to and from the catalyst sample withdrawal position. The length of time that the stator and rotor apertures are in alignment determines the quantity of catalyst withdrawn.

It is therefore an embodiment of this invention to provide an apparatus for periodically withdrawing samples of solid particle-form material from a closed vessel containing a fixed bed of such material which comprises an elongated casing extending through an opening in a wall of said vessel and upwardly into said bed; means sealably securing the lower end portion of the casing to said vessel wall; an elongated hollow tubular rotor rotatably mounted within the casing and extending downwardly therethrough beyond said securing means to the exterior of the casing and said vessel, the lower external portion of said rotor including a pair of spaced serially connected block valves; a first opening formed in the casing wall within said vessel; a second opening formed in the rotor wall and adapted to register with said first opening only during a limited angular displacement of the rotor, corresponding to its sample withdrawal position, to form a fixed port of restricted cross-section connecting the interior of the rotor with the exterior of the casing, said first opening being otherwise closed by the rotor wall; and reversible rotary drive means coupled to said rotor for reciprocably turning the rotor about its longitudinal axis to and from its sample withdrawal position.

The structure and operation of the invention is more explicitly described in connection with the accompanying drawing which is presented as illustrative of the best mode of practicing the invention, but is not intended to be limiting upon the broad scope thereof and in which:

FIGURE 1 is a partially sectioned elevation view of the catalyst sampling apparatus.

FIGURES 2 and 3 are enlarged views of the tip of the apparatus showing the rotor in the catalyst withdrawal and shutoff positions, respectively.

In FIGURE 1, numeral 11 denotes a portion of the lower wall or lower head of a high pressure reactor. Within the reactor is a fixed bed of catalyst particles 12 which are typically spherical in shape with a sphere diameter in the range of 0.05–0.20 inch; it will be understood that other particle sizes and shapes such as cubes, cylinders, extrudates, irregular pellets and the like can be accommodated by the invention. The reactor may be adapted for downflow, radial flow or upflow operation; the customary reactor hardware such as screens and baffles has been omitted from the drawing for the sake of simplicity, inasmuch as the particular internal arrangement of the reactor is conventional and has no bearing on the invention. A flanged nozzle 13 provides a means for inserting, mounting and supporting the sampling apparatus proper. This nozzle may be especially designed for this purpose or it may be the usual catalyst unloading nozzle.

In the embodiment herein illustrated, the sampling apparatus comprises a pair of concentric tubes or pipes including an outer stationary pipe or stator member 14 and an inner pipe or rotor member 17 rotatably mounted within stator 14. The lower end of stator 14 is welded to or otherwise formed into a flange 19 which mates with and is bolted to flange 13, the juncture therebetween being sealed by a ring gasket 20. The stator-rotor assembly extends upwardly into bed 12, preferably at an angle inclined to the horizontal of from about 30° to about 80°. The upper end of stator 14 is closed by a plug or plate 16 to prevent entry of catalyst therein. It is not necessary that the longitudinal surface of the rotor be tightly fitted against the longitudinal surface of the stator so as to form a fluid-tight seal, but only that the clearance therebetween be small enough so that no substantial quantity of catalyst will work its way between the members; in general, a radial clearance of 0.01–0.04 inch is satisfactory. The hollow rotor 17 projects downwardly well beyond nozzle 13, the lower external portion of the rotor being coupled to a rotary drive means and further including a particle transfer means as hereinafter described. The rotor is retained in place against gravity or pressure-induced longitudinal displacement by a lock ring 21 which engages a corresponding recess in flange 19. The annular clearance gap between rotor 17 and flange 19 is sealed by a compression ring 23 which bears against packing 22 to prevent fluid leakage while allowing rotation of the rotor 17.

A small rectangular slot 15 is cut through the wall of the upper tip portion of stator 14. A similar slot 18 (FIGURES 2, 3) is cut, contiguous to slot 15, through the wall of rotor 17. Slots 15 and 18 are so proportioned and spaced as to register with each other only over a limited angular displacement of the rotor relative to the stator, e.g., preferably an angular travel of from about 10° to about 90° of arc. FIGURE 2 shows slots 15 and 18 in mutual registry whereby the particulated catalyst surrounding the tip of stator 14 may enter the resulting port thus formed and descend by gravitation through the hollow interior of rotor 17. When rotor 17 is turned through a sufficient displacement, as in FIGURE 3, slot 15, is blanked off by the imperforate wall of rotor 17 so that catalyst can no longer enter the rotor. The quantity of catalyst which is withdrawn during any given sampling operation is determined by the free area of overlap between slots 15 and 18, which is fixed, and also by the duration of time that the slots are permitted to overlap, which is adjustable. Obviously many other configurations as to the size and shape of the openings 15 and 18 are encompassed by the invention; for example, the slots may be square, circular, oval, etc., and the design may include a plurality of slots in each of the stator and rotor members so arranged as to open and close substantially simultaneously. If desired, the stator-rotor openings may be located in the upper end wall 16, in which case a corresponding orificed end wall would be provide for the internal rotor member. The main consideration is that the stator and rotor openings register or overlap only during a limited angular displacement of the rotor, corresponding to the sample withdrawal position, to form a fixed port (e.g. one that does not move radially or longitudinally with respect to rotor displacement) of restricted cross section connecting the interior of the rotor with the exterior of the stator, the stator opening being otherwise closed by the imperforate wall of the rotor.

In order to minimize the potential hazard to operating personnel in the event of seal failure during catalyst sampling, which might release high pressure, high temperature gases in the vicinity of nozzle 13, it is desirable that the rotary drive means and catalyst transfer means be automatically actuated by remote control. One suitable rotary drive means, as shown in FIGURE 1, comprises a ring gear 24 fixedly attached to the lower external extension of rotor 17. Ring gear 24 meshes with a bevel drive gear 25 which in turn is driven by a reversible electric motor 27 through a speed reducer 26. The motor 27 may be locally mounted, as by the use of vertical struts 28 carried by a beam 29. The electric motor may be controlled as to its forward, stop and reverse sequencies, by a remotely installed push button station.

With further reference to FIGURE 1, the catalyst transfer means comprises a pair of air motor-operated block valves or gate valves 30 and 31 which are serially connected into the lower external portion of rotor 17. The valves are stroked by air pressure delivered through lines 32 and 33. Since these valves are carried by the rotor and turn back and forth together therewith through an arc ranging from 10° to 90°, lines 32 and 33 should be sufficiently flexible to accommodate such movement; for example, lines 32 and 33 may be formed of copper, aluminum or stainless tubing bent into a large radius arc or loop near the connection nipple on the valve diaphragm head. Valves 30 and 31 are longitudinally spaced such that the volume of the rotor therebetween is greater than the largest anticipated catalyst sample volume in order that when valve 30 is closed, it will not crush or become jammed with catalyst. A pressuring and purge gas line 34, provided with a valve 35, connects with the section of the rotor beween valves 30 and 31. The purge medium is supplied from a high pressure source and may be any suitable gas such as nitrogen, carbon dioxide, hydrogen or light hydrocarbon, as will be safely compatible with the fluid contents of the reactor. A vent line 36, provided with a valve 37, is T'd into line 34. Lines 34 and 36 are also composed of relatively flexible conduit in order to facilitate a limited reversible rotation of rotor 17.

When the apparatus is not in use, slot 15 being closed, valves 30, 31 and 35 are closed, and the valve 37 is left open, thus providing a double block and bleed type of closure. Immediately prior to taking a catalyst sample, valve 37 is closed and valves 35 and 30 are opened. The interior of rotor 17 is pressured up with nitrogen to, or preferably somewhat above, reactor pressure. Rotor 17 is then turned into its sample withdrawal position, e.g., slot 18 moving into alignment with slot 15 as shown in FIGURE 2. The particle-form catalyst flows into the rotor and descends into the lower section thereof between valves 30 and 31. During this phase it is desirable to maintain a purge flow of nitrogen upwardly through the rotor in order to minimize the quantity of reactor fluid carried over into the lower section of the rotor. When the desired volume of catalyst is withdrawn, the rotor is turned back to its shutoff position. Valve 35 is closed and valve 37 is opened, allowing the lower section of the rotor containing the catalyst to depressure to atmospheric pressure. If the catalyst is unduly hot, it may be left in place for awhile until it is cooled to a safe temperature. Finally, valve 31 is opened and the catalyst is discharged from opening 38 into a suitable receptacle for transport to the analytical laboratory. If the catalyst must be protected from contact with air, valve 35 can be cracked slightly to furnish an inert gas purge around the sample during its discharge.

Many variations of and substitutions in the above specifically described apparatus will be apparent to those skilled in the art and are deemed within the scope of the claims. For example, the stator may be sealably attached to the reactor wall by a threaded or welded connection, or the stator may be integrally fabricated therewith. Also, the rotor-stator longitudinal surfaces may be provided with a plurality of longitudinally spaced ball-bearing or roller-bearing races to reduce torque requirements. The upper end of the stator may be left open and the upper end of the rotor closed, or the ends of the stator and the rotor may both be closed. With regard to the reversible rotary drive means, this may comprise a pneumatic or hydraulic piston, either double-acting or single acting with spring return, mechanically coupled to the rotor by a connecting rod linkage or rack-and-pinion gear. Alternatively, the rotor may be manually operated by means of a cable or chain-driven sprocket, such cable or chain being extended downwardly to grade for access to the unit operator.

Although the invention has been specifically described in connection with the sampling of catalyst from a high pressure reactor, it will be obvious that the invention may also be employed to take samples of any solid particle-form material from a closed vessel. An exemplary application is the sampling of a solid particle-form adsorbent, such as molecular sieves, silica gel or activated charcoal, from a fluid-solid contacting chamber or tower employed in a separation process for the separation of fluid components by contact with a fixed bed of solid adsorbent.

I claim as my invention:

1. Apparatus for periodically withdrawing samples of solid particle-form material from a closed vessel containing a fixed bed of such material which comprises an elongated casing extending through an opening in a wall of said vessel and upwardly into said bed; means sealably securing the lower end portion of the casing to said vessel wall; an elongated hollow tubular rotor rotatably mounted within the casing and extending downwardly therethrough beyond said securing means to the exterior of the casing and said vessel; a pair of block valves, spaced apart along the longitudinal axis of said hollow rotor, and connected in serial flow communication into and carried by the lower external portion of said hollow rotor; a first opening formed in the casing wall within said vessel; a second opening formed in the rotor wall and adapted to register with said first opening only during a limited angular displacement of the rotor, corresponding to its sample withdrawal position, to form a fixed port of restricted cross-section connecting the interior of the rotor with the exterior of the casing, said first opening being otherwise closed by the rotor wall; and reversible rotary drive means coupled to said rotor for reciprocably turning the rotor, and said block values carried thereby, about its longitudinal axis to and from its sample withdrawal position.

2. The apparatus of claim 1 further characterized in that the longitudinal axis of the casing-rotor assembly is inclined to the horizontal.

3. The apparatus of claim 1 further characterized in the provision of conduit means for introducing a purge gas into the rotor at a point between said block valves.

4. The apparatus of claim 1 further characterized in the provision of conduit means for venting the section of the rotor lying between said block valves.

5. The apparatus of claim 1 further characterized in that said first and second openings are slots of small dimensions in comparison with the length of the casing-rotor assembly.

6. The apparatus of claim 5 further characterized in that said slots are located near the upper end of said casing.

7. Apparatus for periodically withdrawing samples of solid particle form material from a closed vessel containing a fixed bed of such material which comprises an elongated tubular casing extending through an opening in a wall of said vessel and upwardly into said bed at an angle inclined to the horizontal; means sealably securing the lower end portion of the casing to said vessel wall; an elongated hollow tubular rotor rotatably mounted within the casing and extending from the upper end thereof downwardly therethrough beyond said securing means to the exterior of the casing and said vessel; a pair of block valves, spaced apart along the longitudinal axis of said hollow rotor, and connected in serial flow communication into and carried by the lower external portion of said hollow rotor; a first opening formed in the casing wall within said vessel; a second opening formed in the rotor wall and adapted to register with said first opening only during a limited angular displacement of the rotor, corresponding to its sample withdrawal position, to form a fixed port of restricted cross-section connecting the interior of the rotor with the exterior of the casing, said first opening being otherwise closed by the rotor wall; reversible rotary drive means coupled to said rotor for reciprocably turning the rotor, and said block valves carried thereby, about its longitudinal axis to and from its sample withdrawal position; valved conduit means for introducing a purge gas into the rotor at a point between said block valves and valved conduit means for venting the section of the rotor lying between said block valves.

8. The apparatus of claim 7 further characterized in the provision of means connecting with said block valves for actuating the latter from a control station remote from said closed vessel.

References Cited

UNITED STATES PATENTS

| | | | |
|---|---|---|---|
| 2,516,097 | 7/1950 | Woodham et al. | 73—422 X |
| 2,973,645 | 3/1961 | Grimes et al. | 73—424 |
| 3,083,577 | 4/1963 | Nelson et al. | 73—422 |
| 3,129,590 | 3/1964 | Ellis | 73—424 |

LOUIS R. PRINCE, *Primary Examiner.*

DANIEL M. YASICH, *Assistant Examiner.*